Dec. 6, 1966    P. E. KAHLER    3,289,461
DETONATION METER
Filed Dec. 5, 1963    6 Sheets-Sheet 1
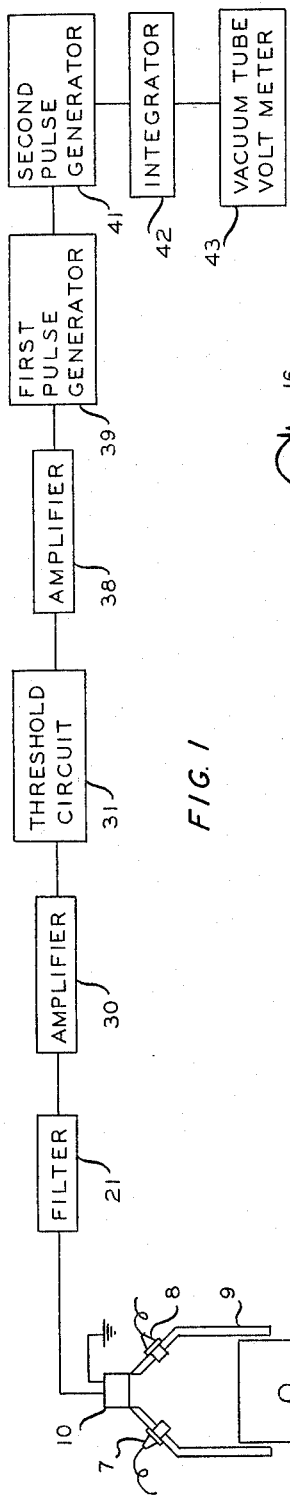
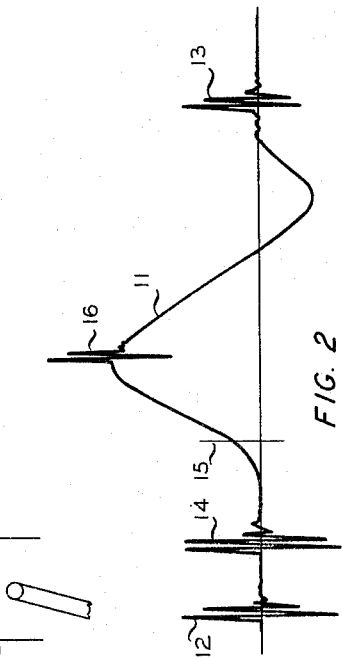
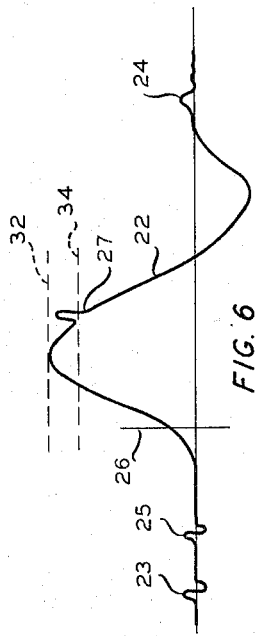
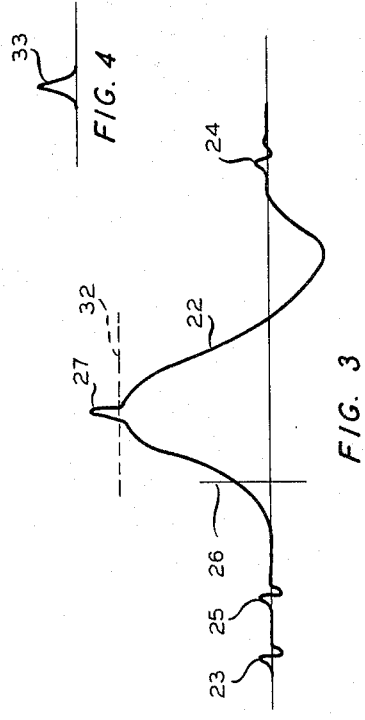
INVENTOR.
P. E. KAHLER
BY *Young & Quigg*
ATTORNEYS

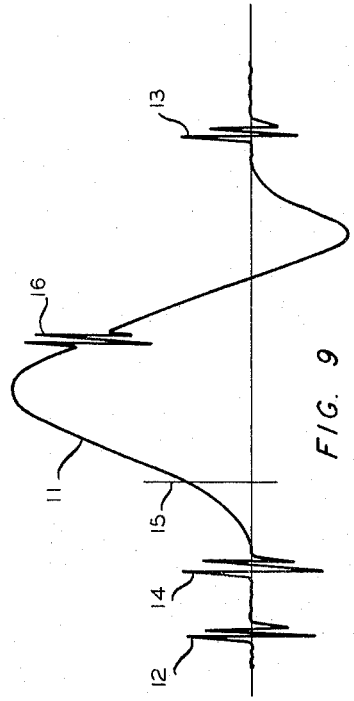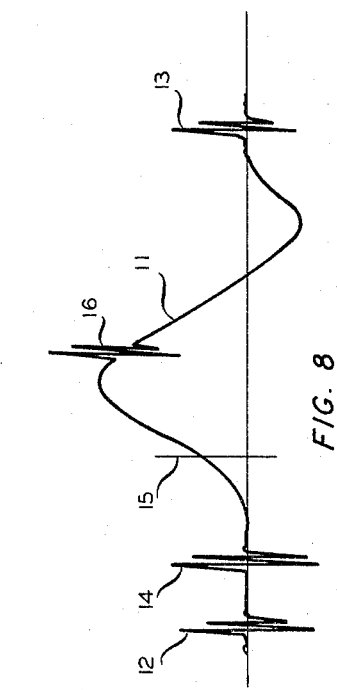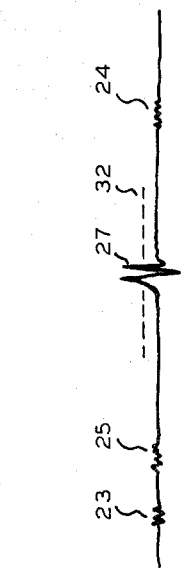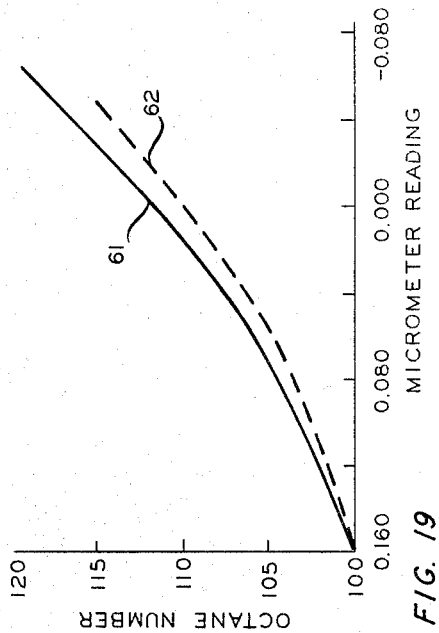

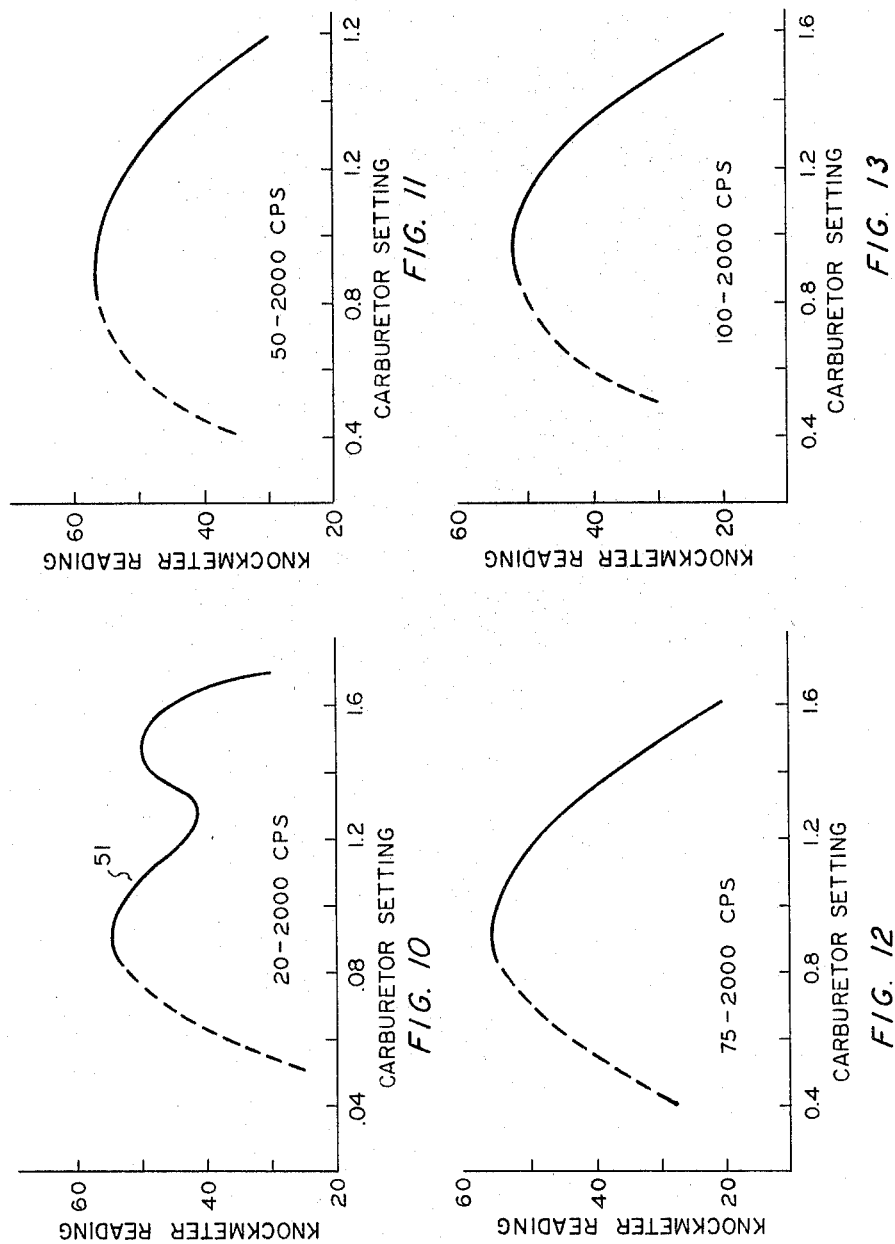

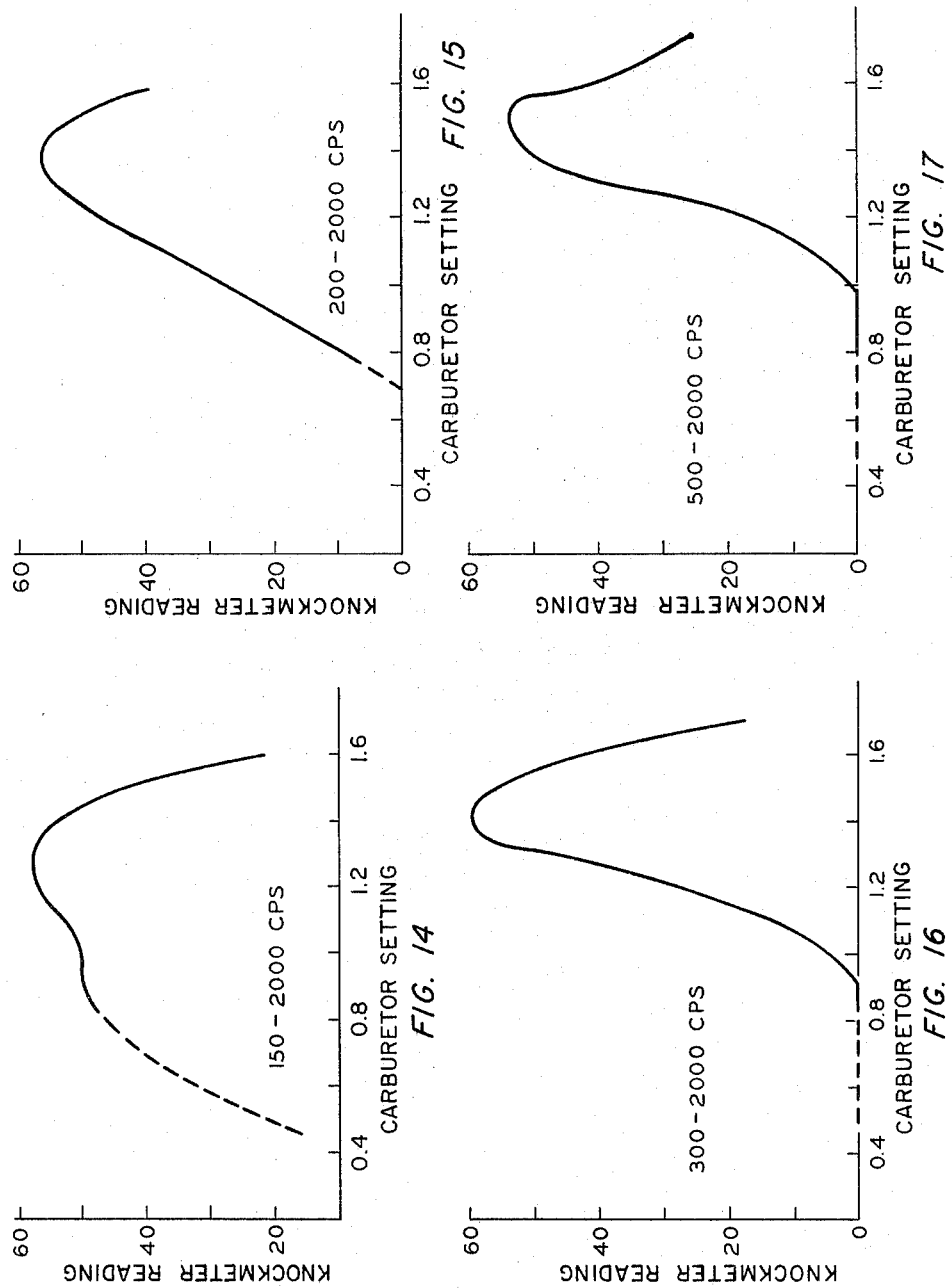

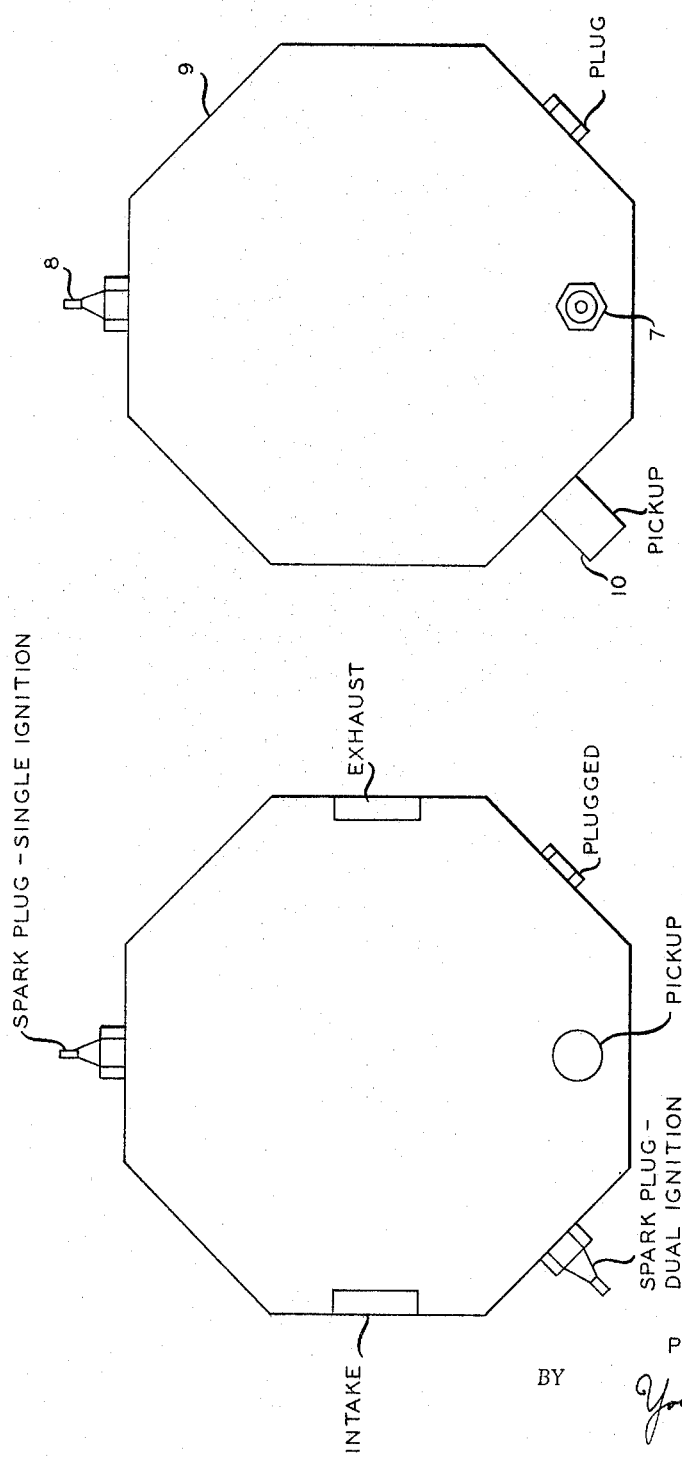

INVENTOR.
P. E. KAHLER
BY Young & Quigg
ATTORNEYS ated Dec. 6, 1966

3,289,461
DETONATION METER
Paul E. Kahler, Bartlesville, Okla., assignor to Phillips Petroleum Company, a corporation of Delaware
Filed Dec. 5, 1963, Ser. No. 328,367
3 Claims. (Cl. 73—35)

This invention relates to detonation meters for use with internal combustion engines. In one aspect the invention relates to improved method and means for measuring detonation of fuels of 100 octane or more.

In D. R. de Boisblanc, U.S. Patent 2,633,738, issued April 7, 1953, there is disclosed a detonation meter comprising a pickup for converting pressure variations in a cylinder into electrical currents, a filter for attenuating undesired noise components such as those due to valve chatter, an amplifier, and a threshold device for rejecting components in the filtered amplified current of less than a predetermined magnitude. The output of the threshold device consists of voltage waves representative of detonations in the engine cylinder. These voltage waves are amplified and fed to a first pulse generating circuit which transforms each wave into a first exponential pulse which decays exponentially from the peak value of the corresponding voltage wave, and thence to a second pulse generating circuit which transforms the successive exponential pulses into second exponential pulses whose rate of decay is relatively small compared to the first pulses. The output of the second generator is then integrated and fed to a vacuum tube voltmeter which indicates the average intensity of knocking over a preselected period.

Two recognized and undesirable operating problems are known to exist in the present ASTM Research method which utilizes the De Boisblanc detonation meter. Both detract from the rating precision of motor fuels, primarily in the range above 100 octane number. One of these problems is the so-called "knockless-knock" rating. A "knockless-knock" rating can be obtained when an attempt is made to rate a fuel with a light knock intensity. Under these conditions the maximum knockmeter reading occurs at a very rich fuel-air ratio where the combustion pulse is considerably stronger than the detonation signal is at the leaner fuel-air ratio where knock is at a maximum. In some instances, knock has completely disappeared at this rich mixture setting of the carburetor. A second factor which can seriously affect rating precision is "surface ignition" which in contrast to the "knockless knock" problem occurs at a higher rather than a low knock intensity. Whenever "surface ignition" occurs, the signal from the pickup is increased, thereby increasing the knockmeter reading. "Surface ignition" generally occurs with the primary bracketing reference fuels first, which, in turn, results in high ratings from the test fuel. Mild "surface ignition" can be so elusive that it may even go undetected by the engine operator.

In accordance with the present invention it has been discovered that these difficulties can be substantially reduced by utilizing a 500–2000 c.p.s. band pass filter instead of the 0–2500 c.p.s. filter presently employed in the detonation meter. Also in accordance with the invention it has been discovered that the reproducibility of the ratings on fuels both above and below 100 octane number can be substantially improved through the utilization of a dual ignition system in combination with a 500–2000 c.p.s. band pass filter.

Accordingly, it is an object of the invention to provide an improved detonation meter. Another object of the invention is to provide a detonation meter having increased accuracy for fuels of over 100 octane. A still further object of the invention is the provision of means which can be utilized with existing detonation meters to increase the accuracy of the readings of the detonation meters for fuels having an octane rating of 100 or higher without requiring extensive modification of the existing detonation meters. Yet another object of the invention is to provide a simple and inexpensive means which can be utilized in combination with existing detonation meters to improve the detonation readings for high octane fuels. Another object of the invention is the provision of an improved method for measuring detonation.

Other objects, aspects and advantages of the invention will be apparent from a study of the disclosure, the drawings and the appended claims to the invention.

In the drawings FIGURE 1 is a block diagram of a detonation meter in accordance with the invention;

FIGURE 2 is a graph representing a typical waveform of the output of the pickup of a conventional detonation meter for a fuel having an octane rating of less than 100;

FIGURE 3 is a graph representing the waveform of FIGURE 2 which has been filtered to attenuate undesired noise components;

FIGURE 4 is a graph representing the output of the threshold device for the waveform of FIGURE 3;

FIGURE 5 is a graph representing a waveform of the output of the pickup of a conventional detonation meter under light knock condition for a fuel having an octane rating of greater than 100;

FIGURE 6 is a graph representing the waveform of FIGURE 5 which has been filtered to attenuate undesired noise components;

FIGURE 7 is a graph representing the output of the threshold device for the waveform of FIGURE 6;

FIGURE 8 is a graph representing a waveform of the output of the pickup of a conventional detonation meter under heavy knock conditions for a fuel having an octane rating of greater than 100;

FIGURE 9 is a graph representing a waveform of the output of the pickup of a detonation meter utilizing dual ignition under heavy knock conditions for a fuel having an octane rating of greater than 100;

FIGURES 10 through 17 are graphical representations of the relationship between knockmeter reading and fuel/air ratio for various bandpass filters;

FIGURE 18 is a graph representing the waveform of any of FIGURES 2, 5, 8 or 9 which has been passed through a 500–2000 c.p.s. bandpass filter in accordance with the invention;

FIGURE 19 is a graphical representation of guide curves for the Research method for fuels having an octane number of over 100;

FIGURE 20 is a plan view of a four-hole cylinder for dual ignition;

FIGURE 21 is a plan view of another arrangement of a four-hole cylinder for dual ignition.

Figure 22:
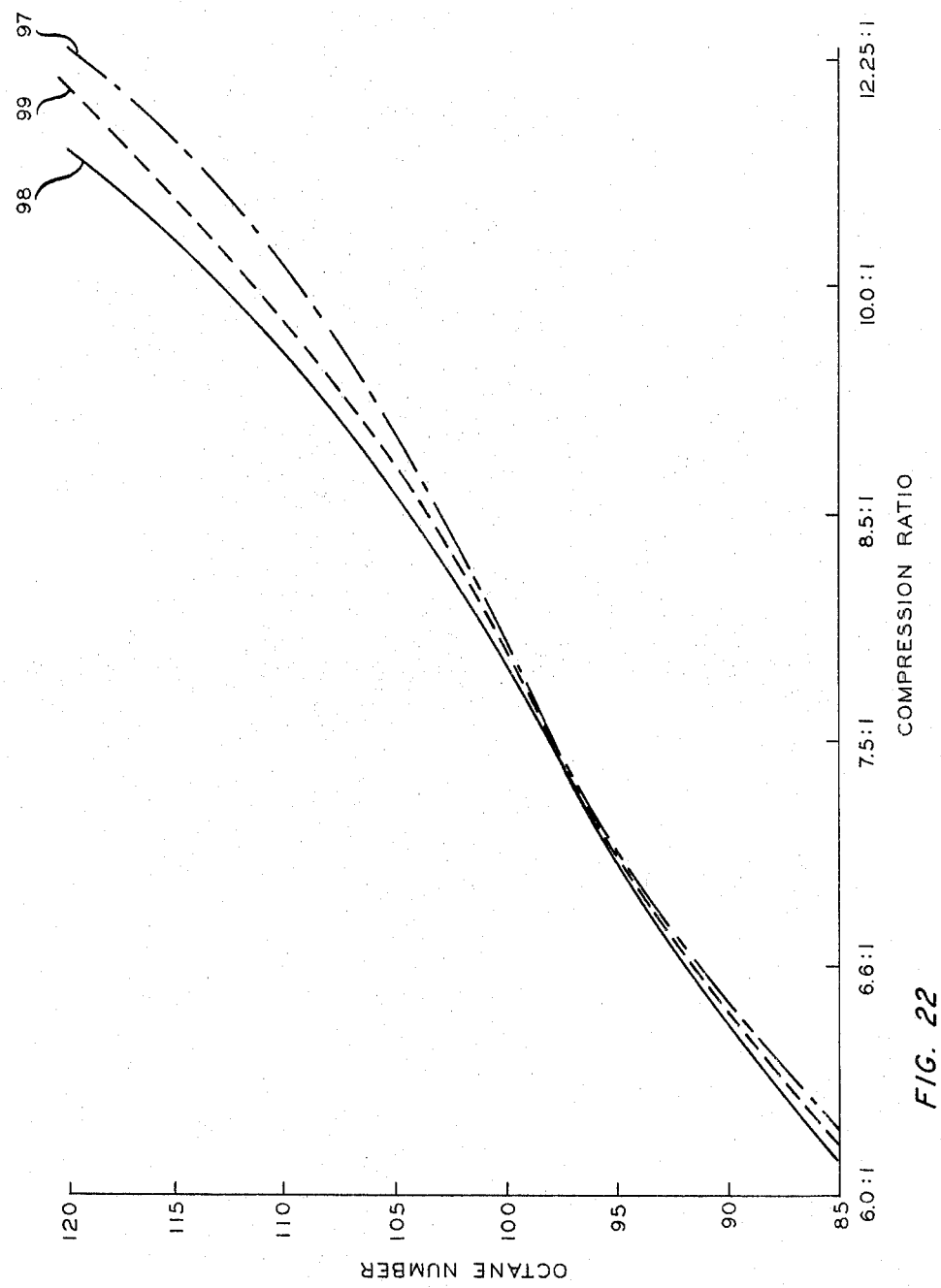
FIGURE 22 is a graphical representation of guide curves for Research method for dual ignition.

Referring now to FIGURE 1 of the drawings there is shown a pickup 10 for converting pressure variations in a cylinder 9 of an internal combustion engine into an electrical signal. Such pickups are well known in the art, and hence, no detailed description thereof is believed necessary. Preferably a magnetostrictive type of pickup, such as that shown in Eldridge patent 2,269,760 is utilized. A typical waveform of the output of pickup 10 when connected to a cylinder utilizing a single spark plug and for a fuel having an octane rating of less than 100 is illustrated in FIGURE 2 and comprises a main pressure wave 11 representative of the pressure variations caused by normal combustion in the cylinder, pulses 12 and 13 representing the opening and closing of the exhaust valves, pulse 14 representing the operation of the intake valve, pulse 15 representing the ignition of the charge in the cylinder, and pulse 16 representing detonation or knocking in the cylinder.

It will be understood that when the engine is operating normally without knocking, the fuel in the cylinder is ignited and the ignition zone spreads uniformally through the cylinder, as indicated by main pressure wave 11. However, when knocking occurs there is a sudden explosion or detonation in the cylinder and this detonation produces sudden pressure variations of considerable magnitude, thereby producing voltage variations in the pickup which are distributed over a wide frequency spectrum. A typical waveform of the output of pickup 10 for a single ignition and a fuel having an octane greater than 100 is illustrated in FIGURE 5. A comparison of FIGURES 2 and 5 readily reveals that the detonation pulse 16 in FIGURE 2 is superimposed upon the main pressure wave 11 in the area of the crest or peak thereof, whereas in FIGURE 5 the detonation pulse 16 is superimposed on the main pressure wave 11 but occurs at a time subsequent to the time of occurrence of the peak of main pressure wave 11 to the extent that the maximum amplitude occurring during the detonation is less than the maximum amplitude of the main pressure wave 11.

The output of pickup device 10 is applied to the input of filter 21. In a conventional detonation meter filter 21 is generally constructed to pass frequencies below a value in the range of 2000 to 4000 cycles per second and to attenuate or substantially eliminate higher frequencies. For such a conventional detonation meter, the output of filter 21 corresponding to the waveform of FIGURE 2 is illustrated in FIGURE 3. It will be noted that the main voltage wave 22 corresponding to main pressure wave 11 is substantially unaffected by passage through filter 21 and has substantially the same shape as main pressure wave 11. However, the voltage pulses 12, 13, 14 and 15 are attenuated by filter 21 and appear respectively as pulses 23, 24, 25 and 26 in the filtered wave. The high frequency components of detonation pulse 16 are attenuated in filter 21 producing pulse 27. However, as filter 21 does not affect the relative time displacement between the high and low frequency components to any appreciable extent the detonation pulse 27 is still riding on the crest of main pressure wave 22.

In a conventional detonation meter, the output of filter 21 corresponding to the wave form of FIGURE 5 is illustrated in FIGURE 6. Again the filtered main pressure wave 22 is substantially unaffected by passage through filter 21 and has substantially the same shape as main pressure wave 11. Also noise components 12, 13, 14 and 15 have been attenuated by passage through filter 21 and are represented in FIGURE 6 by pulses 23, 24, 25 and 26, respectively. The detonation pulse 16 is attenuated to the extent of the reduction or elimination of a portion of high frequency components thereof in its passage through filter 21 and appears as pulse 27 in FIGURE 6. It will be noted that the relationship between the peak of main pressure wave 22 and detonation pulse 27 is unaffected by passage through filter 21 and that the maximum amplitude of the detonation pulse 27 in FIGURE 6 is still less than the amplitude of the peak of main pressure wave 22.

The output of filter 21 is fed to an amplifier 30 which increases the amplitude of the various voltage components but does not change their wave form appreciably. The amplified signal is then fed to the input of threshold device 31 which eliminates all voltage components of less than a predetermined amplitude. Thus for the waveform of FIGURE 3, threshold device 31 would pass only those amplified voltages corresponding to an input voltage to amplifier 30 greater than the level indicated by line 32, thus producing an output represented by pulse 33 in FIGURE 4. The problem of the time displacement between the detonation pulse and the peak of the main pressure wave for a fuel having an octane rating of greater than 100 encountered by a conventional detonation converter meter is illustrated in FIGURE 6. If threshold device 31 is set to pass only amplified voltages corresponding to an input voltage to amplifier 30 greater than the value of the peak of the main pressure wave 22, as indicated by line 33, the output of the threshold circuit would be zero, indicating a condition of no knock. If the threshold value for the unamplified signal is lowered sufficiently to pass the detonation pulse as indicated by line 34, the output of threshold device 31 would comprise both the detonation pulse and a portion of the main pressure wave as indicated by pulses 35 and 36, respectively, in FIGURE 7.

The time displacement problem still exists, although to a lesser extent, where the engine is operated on a fuel having an octane greater than 100 and under heavy knocking conditions. FIGURE 8 illustrates the output of pickup device 10 under such conditions. Although the peak of detonation pulse 16 in FIGURE 8 is greater than the maximum amplitude of combustion pulse 11, the cutoff requirements permits the utilization of only a fraction of the detonation pulse. Similar problems have been encountered when utilizing dual ignition, that is two spark plugs 7 and 8 in cylinder 9. FIGURE 9 illustrates the output of pickup device 10 for a dual ignition cylinder operating under the heavy knocking conditions and the fuel utilized for FIGURE 8. The dual ignition can increase the magnitude of the main combustion wave 11 to the extent that the maximum amplitude of wave 11 becomes greater than the peak of detonation pulse 16. Thus the waveform of FIGURE 9 encounters the same difficulties as the waveform of FIGURE 5.

Where the amplitude of the detonation pulse 27 is sufficiently greater than wave 22 to permit the utilization of threshold level 32, the output of threshold circuit 31, which is a series of voltage waves each having an amplitude proportional to the peak intensity of the detonation pulse corresponding thereto, is applied to the input of amplifier 38. The amplified pulses are then applied to the input of first pulse generator 39 wherein they are transformed into spaced exponential pulses having amplitudes proportional to the respective peak detonation intensities. These exponential pulses are applied to the input of second pulse generator 41 wherein the spaced pulses are converted into over-lapping pulses of longer duration, due to the substantially higher time constant of the pulsing circuit of generator 41 as compared to that of generator 39. The output of second pulse generator 41 has a crest of generally saw-toothed configuration, the peak of each tooth having an amplitude proportional to the peak intensity of the corresponding detonation pulse, and is applied to the input of integrator 42 wherein a smooth steady voltage is produced which is proportional to the average peak detonation intensity indicated by a series or plurality of voltage waves produced by successive detonations in the cylinder. The output of integrator 42 is applied to the input of vacuum tube volt meter 43. Amplifier 30, threshold 31, amplifier 38, first pulse generator 39, integrator 42 and volt meter 43 can be any suitable devices known in the art, such as those set forth in U.S. Patent 2,633,738, the description of which is incorporated herein by reference.

To illustrate the effects of the main combustion pressure wave on the detonation meter for fuels having an octane value greater than 100, the relationship between detonation meter reading and fuel/air ratio for various frequency bands is graphically presented in FIGURES 10–17. Each curve was obtained under the same conditions of light knock and using a 113.7 octane number toluene blend (74 volume percent toluene and 26 volume percent isooctane). The dashed section of each curve is representative of the output of the detonation meter in the absence of actual knock, as determined by an oscilloscope. The solid section of each curve is representative of the output of the detonation meter during actual knocking conditions. Curve 51 in FIGURE 10 is representative of the condition which exists when a "knockless knock" rating is obtained with a conventional detonation meter as the frequency band of 20–2000 c.p.s. approximates that of the conventional meter. It can be noted that the peak detonation meter reading is occurring at a false rich mixture setting of the carburetor where knock is so light it can be detected only by an oscilloscope and the detonation meter reading is the result of the much stronger combustion signal. As can be noted from FIGURES 10–17, the maximum meter reading moves into the harder knocking and more accurate, leaner fuel-air ratio range as more and more of the lower frequencies are eliminated. The elimination of the frequencies in the 0–200 c.p.s. range, as illustrated in FIGURE 15, also substantially eliminates the problem of knockless-knock and provides a sharp peak. By the time the frequency band of 500–2000 c.p.s. is reached, as shown in FIGURE 17, the maximum meter reading is occurring consuming. The output of the 500–2000 c.p.s. bandpass filter for the pickup output corresponding to the waveform of any of FIGURES 2, 5, 8 or 9 is illustrated in FIGURE 18 (Sheet 2).

The 500–2000 c.p.s. bandpass filter permits the utilization of lower knock intensities. To establish a guide curve of lighter knock intensity in the range above 100 octane number, a number of engines were allowed to track their own guide curve. This was done by setting each engine on the present guide curve at 100 octane number and then adjusting the meter for a knockmeter reading of 55. Without further adjustment of the meter controls, the compression ratio was adjusted for a knockmeter reading of 55 each time a reference fuel was changed to obtain another guide curve point. The resulting guide curve is plotted in FIGURE 19 (Sheet 2) as curve 61. Standard curve 62, developed by ASTM, is shown for comparative purposes. A group of coded fuels above 100 octane number were selected to be rated using four different operators and four different Research engines. In each run by a given operator on a given engine the fuels were rated as unknowns using a standard detonation meter and again rating the fuels as unknown using a detonation meter with a 500–2000 c.p.s. bandpass filter. Before rating the engine was tuned, if necessary, so that a toluene standardization fuel blend of 108.0 octane number rated correctly. The term "tuning" refers to a method, approved by ASTM for use with Research methods, whereby the intake air temperature is adjusted until a calibrated standardization fuel blend rates correctly. Tuning is permitted if the initial rating, before tuning, is within certain allowable limits. The results of this work is set forth in Table I.

TABLE I

| Fuel Description | Std. Res. Method Calib. Rating | Modified Meter [1] | | | | | | | | | | | | Std. Meter [2] | |
|---|---|---|---|---|---|---|---|---|---|---|---|---|---|---|---|
| | | Research Ratings | | | | | | | | | | Avg. Rating Data | | Avg. Rating Data | |
| | | Run #1 | Run #2 | Run #3 | Run #4 | Run #5 | Run #6 | Run #7 | Run #8 | Run #9 | Run #10 | Avg. Rating | Std. Dev. | Avg. Rating | Std. Dev. |
| 108.0 Toluene Blend [3] | 108.0 | 108.3 | 108.6 | 107.4 | [5]108.1 | 108.5 | 106.5 | [5]108.0 | [5]108.1 | [5]108.0 | 107.7 | | | | |
| 108.0 Toluene Blend [4] | 108.0 | 108.0 | 108.0 | 108.1 | _____ | 108.1 | 108.0 | _____ | _____ | _____ | 108.0 | | | | |
| Change in IAT for Tuning, °F | _____ | +8 | +10 | −8 | 0 | +7 | −27 | 0 | 0 | 0 | −5 | | | | |
| RMFD-112-61 | 104.6 | 104.9 | 104.9 | 104.6 | 104.4 | 104.7 | 104.6 | 104.4 | 104.8 | 104.6 | 104.5 | 104.6 | 0.189 | 105.4 | 0.385 |
| 106.1 Toluene Blend | 106.1 | 105.6 | 105.5 | 105.3 | 105.0 | 105.4 | 105.7 | 105.5 | 106.0 | 105.8 | 105.6 | 105.5 | 0.279 | 105.8 | 0.271 |
| 115/145 Avgas | 106.1 | 105.7 | 105.7 | 105.4 | 106.3 | 105.3 | 105.6 | 105.4 | 106.4 | 105.8 | 106.0 | 105.8 | 0.378 | 106.0 | 0.494 |
| 113.7 Toluene Blend | 113.7 | 113.4 | 113.3 | 113.9 | 113.7 | 113.7 | 112.8 | 114.0 | 113.3 | 113.7 | 113.4 | 133.5 | 0.353 | 113.8 | 0.567 |
| 50% DIB + 50% iC₈ | [6]106.0 | 105.8 | 106.7 | 105.5 | 106.2 | 105.5 | 105.8 | 105.9 | 106.5 | 106.7 | 106.4 | 106.1 | 0.462 | 105.6 | 0.415 |
| Engine Number | _____ | #2 | #2 | #4 | #2 | #4 | #6 | #6 | #7 | #7 | #7 | | | | |
| Operator Number | _____ | #1 | #3 | #2 | #4 | #2 | #3 | #1 | #4 | #3 | #2 | | | | |
| Average Standard Deviation | _____ | _____ | _____ | _____ | _____ | _____ | _____ | _____ | _____ | _____ | _____ | | 0.332 | | 0.426 |

[1] 500–2,000 c.p.s. filter band with guide curve 61.
[2] Standard Guide Curve 62.
[3] Untuned Rating.
[4] Tuned Rating.
[5] No Tuning Required.
[6] Phillips Calibrated Rating.

at the leaner fuel-air ratio, and the meter readings at the richer fuel-air ratios have dropped to zero. The sharp peak of the curve of FIGURE 17 also indicates that the elimination of the lower frequencies increases engine knock sensitivity to change in fuel-air ratio, thereby making the determination of the maximum reading less time As indicated by the average standard deviations, a marked improvement in rating reproducibility was obtained for the fuels above 100 octane number. The data also indicates that the ASTM Research method ratings are essentially unchanged by the use of the 500–2000 c.p.s. bandpass filter.

The utilization of dual ignition for rating fuels having an octane number less than 100 has resulted in improved cycle to cycle repeatability. However, the utilization of dual ignition for rating fuels having an octane number greater than 100 had not previously been feasible as the output of the pickup had the waveform illustrated in FIGURE 9. This is the result of the dual ignition greatly increasing the amplitude of the combustion pulse relative to the detonation pulse. However, this problem is eliminated through the utilization of a bandpass filter to exclude frequencies in the 0–500 c.p.s. range.

To exemplify the advantages of the combinattion of dual ignition and a 500–2000 c.p.s. bandpass filter, several runs were made. For the dual ignition runs, as shown in FIGURE 20, spark plug 8 was placed in the regular spark plug hole of a single cylinder internal combustion engine while spark plug 7 was placed in the upper hole. Pickup 10 was placed in the left side hole while the right side hole was plugged. Spark plugs 7 and 8 were actuated to substantially simultaneously ignite the combustible material in the cylinder at the two spaced points or locations of the spark plugs. A constant knock intensity, as indicated by constant voltage on the scope after the filter, was utilized to develop the guide curves. The voltage level was so selected as to give an audible knock intensity between the present Research and Motor methods but on the Research side of the mid-point. A constant spark advance of 17° was used in view of the operation advantages over the standard variable advance. The resulting guide curve data is set forth in Table II.

TABLE II.—DUAL IGNITION GUIDE CURVE

| Dual Ignition | | | | | |
|---|---|---|---|---|---|
| Motor Method Conditions Except Constant Spark Advance of 17° | | | Modified Knockmeter Using 500–2,000 Band Pass Filter | | |
| Octane Number | Micro. Setting | Octane Number | Micro. Setting | Octane Number | Micro. Setting |
| 80.0 | 0.592 | 93.5 | 0.438 | 107.0 | 0.345 |
| 80.5 | 0.585 | 94.0 | 0.434 | 107.5 | 0.342 |
| 81.0 | 0.578 | 94.5 | 0.430 | 108.0 | 0.339 |
| 81.5 | 0.571 | 95.0 | 0.426 | 108.5 | 0.337 |
| 82.0 | 0.564 | 95.5 | 0.422 | 109.0 | 0.334 |
| 82.5 | 0.557 | 96.0 | 0.418 | 109.5 | 0.331 |
| 83.0 | 0.550 | 96.5 | 0.415 | 110.0 | 0.329 |
| 83.5 | 0.544 | 97.0 | 0.411 | 110.5 | 0.326 |
| 84.0 | 0.538 | 97.5 | 0.408 | 111.0 | 0.324 |
| 84.5 | 0.531 | 98.0 | 0.404 | 111.5 | 0.322 |
| 85.0 | 0.525 | 98.5 | 0.400 | 112.0 | 0.319 |
| 85.5 | 0.519 | 99.0 | 0.397 | 112.5 | 0.317 |
| 86.0 | 0.513 | 99.5 | 0.394 | 113.0 | 0.314 |
| 86.5 | 0.507 | 100.0 | 0.390 | 113.5 | 0.312 |
| 87.0 | 0.501 | 100.5 | 0.386 | 114.0 | 0.310 |
| 87.5 | 0.495 | 101.0 | 0.383 | 114.5 | 0.308 |
| 88.0 | 0.490 | 101.5 | 0.379 | 115.0 | 0.306 |
| 88.5 | 0.485 | 102.0 | 0.376 | 115.5 | 0.302 |
| 89.0 | 0.480 | 102.5 | 0.372 | 116.0 | 0.302 |
| 89.5 | 0.475 | 103.0 | 0.369 | 116.5 | 0.300 |
| 90.0 | 0.470 | 103.5 | 0.366 | 117.0 | 0.298 |
| 90.5 | 0.465 | 104.0 | 0.362 | 117.5 | 0.296 |
| 91.0 | 0.460 | 104.5 | 0.359 | 118.0 | 0.294 |
| 91.5 | 0.455 | 105.0 | 0.356 | 118.5 | 0.293 |
| 92.0 | 0.451 | 105.5 | 0.353 | 119.0 | 0.291 |
| 92.5 | 0.447 | 106.0 | 0.350 | 119.5 | 0.290 |
| 93.0 | 0.443 | 106.5 | 0.347 | 120.0 | 0.288 |

The ratings using both single and dual ignition for the standardization fuels and test fuels are set forth in Table III.

TABLE III.—MOTOR METHOD [1] RATINGS USING DUAL IGNITION AND MODIFIED METER (500–2,000 FILTER)

| Fuel | Std. Motor Method Calib. Rating | Dual Ignition and Modified Meter (500–2,000) Motor Method [1] Ratings | | | | | | | | | |
|---|---|---|---|---|---|---|---|---|---|---|---|
| | | Individual Ratings | | | | | | | | | |
| | | Run #1 | Run #2 | Run #3 | Run #4 | Run #5 | Run #6 | Run #7 | Run #8 | Run #9 | Run #10 |
| 74% Toluene + 14% iC$_8$[2] + 12% nC$_7$ | 91.7 | 91.3 | 91.4 | 91.5 | 91.4 | 91.3 | 9.12 | | 91.4 | 91.5 | 91.4 |
| 74% Toluene + 14% iC$_8$[3] + 12% nC$_7$ | | 93.1 | 93.0 | 93.2 | 92.8 | 92.9 | 92.8 | 93.0 | 93.0 | 93.0 | 93.2 |
| RMFD 111-61 | 87.9 | 86.5 | 86.4 | 88.1 | 87.8 | 86.6 | 86.6 | 86.9 | 86.7 | 86.7 | 86.2 |
| Light Alkylate (Clear) | b 90.5 | 90.2 | 90.0 | 90.2 | 90.4 | 90.0 | 90.2 | 90.1 | 90.2 | 90.3 | 90.2 |
| 74% Toluene + 18% iC$_8$ + 8% nC$_7$ | 95.1 | 97.6 | 97.3 | 97.2 | 97.0 | 97.4 | 97.1 | 97.2 | 97.8 | 97.5 | 97.8 |
| 50% DIB + 50% iC$_8$ + 2.5 ml. TEL/Gal | b 95.0 | 93.7 | 93.7 | 94.7 | 94.2 | 94.2 | 94.1 | 94.2 | 94.0 | 93.6 | 94.5 |
| Operator Number | | 2 | 1 | 2 | 1 | 2 | 1 | 2 | 1 | 1 | 2 |
| Engine Number | | 0 | 0 | 1 | 1 | 3 | 3 | 3 | 3 | 5 | 5 |
| Cylinder Number | | 165 | 165 | 166 | 166 | 165 | 165 | 166 | 166 | 166 | 165 |

| Fuel | Dual Ignition and Modified Meter (500–2,000) Motor Method [1] Ratings | | | | | Other Motor Method Data—Average Rating Data | | | |
|---|---|---|---|---|---|---|---|---|---|
| | Individual Ratings | | | Average Rating Data | | Std. Method | | 500–2,000 Meter Hi-Intensity Guide Curve | |
| | Run #11 | Run #12 | Run #13 | Avg. Rating | Std. Dev. | Avg. Rating | Std. Dev. | Avg. Rating | Std. Dev. |
| 74% Toluene+14% iC$_8$[2] +12% nC$_7$ | 91.6 | 91.4 | 91.4 | | | | | | |
| 74% Toluene+14% iC$_8$[3] +12% nC$_7$ | 93.3 | 93.0 | 92.9 | 93.0 | 0.153 | | | | |
| RMFD 111-61 | 86.2 | 87.1 | 87.0 | 86.8 | 0.570 | 88.1 | 0.530 | 87.6 | 0.462 |
| Light Alkylate (Clear) | 90.0 | 90.1 | 90.2 | 90.2 | 0.126 | 90.5 | 0.151 | 90.5 | 0.194 |
| 74% Toluene+18% iC$_8$ +8% nC$_7$ | a 98.5 | 97.5 | 97.1 | 97.4 | 0.271 | 95.0 | 0.275 | 95.3 | 0.290 |
| 50% DIB+50% iC$_8$ +2.5 ml. TEL/Gal | 93.7 | 94.4 | 94.1 | 94.1 | 0.339 | 94.8 | 0.702 | 95.4 | 0.450 |
| Operator Number | 1 | 1 | 2 | | | | | | |
| Engine Number | 5 | 7 | 7 | | | | | | |
| Cylinder No | 165 | 166 | 166 | | | | | | |
| Average Standard Deviation for Fuels Below 100 Octane 0.326 | | | | | | | 0.414 | | 0.349 |

See footnotes at end of table.

TABLE III.—MOTOR METHOD [1] RATINGS USING DUAL IGNITION AND MODIFIED METER
(500–2,000 FILTER)—Continued

| Fuel | Std. Motor Method Calib. Rating | Dual Ignition and Modified Meter (500–2,000) Motor Method [1] Ratings—Individual Ratings | | | | | | | | | |
|---|---|---|---|---|---|---|---|---|---|---|---|
| | | Run #14 | Run #15 | Run #16 | Run #17 | Run #18 | Run #19 | Run #20 | Run #21 | Run #22 | Run #23 |
| 25% Toluene+75% iC$_8$ [2]+1.0 ml. TEL | 104.0 | 103.9 | 103.8 | 104.1 | 104.3 | 103.9 | 103.9 | | 103.6 | 104.2 | |
| 25% Toluene+75% iC$_8$ [3]+1.0 ml. TEL | | 104.6 | 104.6 | 104.9 | 104.8 | 104.7 | 104.8 | 104.6 | 104.6 | 104.8 | 104.7 |
| 25% DIB+75% iC$_8$+4.0 ml. TEL | [b] 102.6 | 103.0 | 102.9 | 103.0 | 103.2 | 103.0 | 102.8 | 102.8 | 103.1 | 102.9 | 102.9 |
| 90% Toluene+10% iC$_8$ | 103.3 | 108.6 | 107.7 | 107.8 | 107.4 | 108.1 | 107.9 | 108.1 | 107.6 | 108.0 | 108.4 |
| 115/145 Avgas | 104.8 | 106.5 | 106.3 | 106.7 | 107.0 | 106.6 | 106.7 | 106.8 | 106.0 | 106.4 | 106.5 |
| 25% Toluene+75% iC$_8$+2.0 ml. TEL | 106.8 | 107.2 | 107.4 | 107.3 | 107.1 | 106.7 | 107.3 | 106.5 | 106.3 | 106.6 | 106.8 |
| Operator Number | | 2 | 1 | 2 | 1 | 2 | 1 | 2 | 1 | 1 | 2 |
| Engine Number | | 0 | 0 | 1 | 1 | 3 | 3 | 3 | 3 | 5 | 5 |
| Cylinder Number | | 165 | 165 | 166 | 166 | 165 | 165 | 166 | 166 | 166 | 165 |

| Fuel | Dual Ignition and Modified Meter (500–2,000) Motor Method [1] Ratings | | | | | Other Motor Method Data | | | |
|---|---|---|---|---|---|---|---|---|---|
| | Individual Ratings | | | Average Rating Data | | Average Rating Data | | | |
| | | | | | | Std. Method | | 500–2,000 Meter Hi-Intensity Guide Curve | |
| | Run #24 | Run #25 | Run #26 | Avg. Rating | Std. Dev. | Avg. Rating | Std. Dev. | Avg. Rating | Std. Dev. |
| 25% Toluene+75% iC$_8$ [2]+1.0 ml. TEL | 103.8 | 103.9 | 103.8 | | | | | | |
| 25% Toluene+75% iC$_8$ [3]+1.0 ml. TEL | 104.5 | 104.7 | 104.6 | 104.7 | 0.115 | | | | |
| 25% DIB+75% iC$_8$+4.0 ml. TEL | 102.8 | 103.2 | 103.0 | 103.0 | 0.141 | 102.6 | 0.305 | 103.1 | 0.265 |
| 90% Toluene+10% iC$_8$ | 108.8 | 108.2 | 108.1 | 108.1 | 0.395 | 102.6 | 0.446 | 103.6 | 0.332 |
| 115/145 Avgas | 106.3 | 106.5 | 106.5 | 106.5 | 0.253 | 104.3 | 0.364 | 105.2 | 0.311 |
| 25% Toluene+75% iC$_8$+2.0 ml. TEL | 160.4 [a] | 197.1 [a] | 107.0 | 106.9 | 0.372 | 105.5 | 0.372 | 106.3 | 0.320 |
| Operator Number | 1 | 1 | 2 | | | | | | |
| Engine Number | 5 | 7 | 7 | | | | | | |
| Cylinder No | 165 | 166 | 166 | | | | | | |
| Average Standard Deviation for Fuels Above 100 Octane Number | | | | | 0.290 | | 0.372 | | 0.307 |
| Average Standard Deviation for all Fuels | | | | | 0.308 | | 0.393 | | 0.328 |

[1] Except Constant Spark Advance of 17°.
[2] Standard Motor Method Ratings.
[3] Dual Ignition and Modified Meter Ratings.
[a] Rejected by Grubbs Criterion.
[b] Phillips Calibrated Ratings.

It will be noted that excellent reproducibility was obtained on the fuels both above and below 100 octane number for the combination of dual ignition and a 500–2000 c.p.s. band pass filter.

Additional runs were made to exemplify the advantages of the combination of dual ignition and a 500–2000 c.p.s. band pass filter for the Research method. All controllable variables were eliminated so that changes in results could be attributed directly to the equipment changes. This was accomplished by utilizing one engine, one operator, one meter, one cylinder, one pickup and one set of preblended fuels.

Ratings on the test fuels in both the above and below 100 octane number ranges were obtained using the following three test conditions:

Condition 1=Single Ignition and Standard Meter
Condition 2=Dual Ignition and Modified Meter
Condition 3=Single Ignition and Modified Meter A fourth condition, the combination of dual ignition and standard meter, was also considered. However, this was not a tolerable system since the increased strength of the combustion pulse with dual ignition results in unsatisfactory operating performance of the standard meter.

The above conditions were selected so that the influence of dual ignition, the modified meter, and a combination of the two on rating precision could be determined. A comparison of the data obtained using Conditions 2 and 3 provided a measure of the effect of dual ignition on rating precision. A comparison of the data obtained using Conditions 1 and 3 provided a measure of the effect of the modified meter on rating precision. A comparison of Conditions 1 and 2 provided a measure of the combined effect of dual ignition and the modified meter on rating precision.

In conducting the runs, every time a fuel was placed in the engine it was rated three times in succession, once at each of the three conditions. The order of the test conditions as well as the test fuels was varied throughout the program. The test fuels were divided into two groups, those above and those below 100 octane number. Blends representing the principal hydrocarbon types in motor fuel (paraffins, aromatics, and olefins) were selected for each group of fuels. Each set of fuels was tested at least eight times by alternately testing the two groups.

As previously mentioned, the effect of method variables on rating precision was held to a minimum by the selection of one cylinder, one meter, one pickup, one engine, etc., for this work. To accommodate both single and dual ignition a non-standard 4-hole cylinder was employed. A diagram of the spark plug and pickup locations in this cylinder are given in FIGURE 21. Spark plug and pickup locations for single ignition were identical to those used in a standard method cylinder. The location of the second spark plug for dual ignition was selected on the basis of best operating performance using cycle-to-cycle reproducibility as a criterion.

The use of a 4-hole cylinder presented a guide curve (compression ratio versus octane number) problem since its combustion chamber configuration does not conform with that of the standard cylinder. For test Condition 1, standard method conditions of single ignition and standard meter, it was necessary to duplicate the standard method guide curve knock intensities. A guide curve for Condition 1 was developed by duplicating the knock intensities in the cylinder of a standard method engine. This was done by measuring the voltage strengths of standard knock signals from a given pickup at different octane number levels and then duplicating them with the 4-hole cylinder. A constant knock intensity, equivalent to that of the standard method at the 85 octane number level, was used in developing guide curves for Conditions 2 and 3. FIGURE 22 presents a plot of three guide curves developed, with curves 97, 98 and 99 representing Conditions 1, 2 and 3, respectively. It is interesting to note that the dual ignition guide curve 98 requires lower compression ratios than the two single ignition guide curves.

A summary of all the octane number ratings obtained on the test fuels at the three different test conditions are given in Table IV. To determine the significance of these rating data they were subjected to statistical analysis.

TABLE IV.—RESEARCH METHOD REPEATABILITY DATA OBTAINED IN EVALUATION OF DUAL IGNITION AND PHILLIPS MODIFIED METER

[Condition 1]

| Fuels Below 100 | Single Ignition and Standard Meter | | | | | | | | | | | |
|---|---|---|---|---|---|---|---|---|---|---|---|---|
| | Calib. Rating | Run Number | | | | | | | | | | Avg. Rating |
| | | 1 | 2 | 3 | 4 | 5 | 6 | 7 | 8 | 9 | 10 | |
| Standardization Fuel (74% Toluene+10% Isooctane+16% N-Heptane) | 99.6 | [2] 99.9 | [2] 100.0 | [3] 100.0 | [3] 100.0 | [3] 99.9 | [3] 100.0 | [2] 99.8 | [3] 99.7 | [2] 99.8 | [3] 99.7 | 99.9 |
| Light Alkylate | [1] 92.0 | 91.8 | 91.6 | 91.7 | 91.8 | 91.8 | 91.9 | 91.6 | 91.8 | 91.7 | 91.7 | 91.7 |
| 50% DIB+42.5% N-Hept.+7.5% Iso-Oct.+3.0 ml. TEL | [1] 93.0 | 93.4 | 93.6 | 93.6 | 93.6 | 93.6 | 93.5 | 93.5 | 93.7 | 93.6 | 93.6 | 93.6 |
| 74% Toluene+26% N-Heptane | 93.4 | 93.2 | 93.5 | 93.4 | 93.9 | 93.7 | 93.6 | 93.2 | 93.4 | 93.8 | 93.5 | 93.5 |
| RMFD-111-61 | 98.0 | 97.6 | 97.7 | 97.9 | 97.8 | 97.8 | 97.8 | 97.7 | 97.7 | 97.7 | 98.0 | 97.8 |

| Fuels Below 100 | Dual Ignition and Modified Meter | | | | | | | | | | | |
|---|---|---|---|---|---|---|---|---|---|---|---|---|
| | Calib. Rating | Run Number | | | | | | | | | | Avg. Rating |
| | | 1 | 2 | 3 | 4 | 5 | 6 | 7 | 8 | 9 | 10 | |
| Standardization Fuel (74% Toluene+10% Isooctane+16% N-Heptane) | 99.6 | [2] 99.4 | [2] 99.3 | [2] 99.4 | [2] 99.4 | [2] 99.4 | [2] 99.6 | [2] 99.4 | [2] 99.3 | [2] 99.2 | [2] 99.2 | 99.3 |
| Light Alkylate | [1] 92.0 | 92.3 | 92.1 | 92.4 | 92.3 | 92.1 | 92.2 | 92.1 | 92.3 | 92.1 | 92.2 | 92.2 |
| 50% DIB+42.5% N-Hept.+7.5% Iso-Oct.+3.0 ml. TEL | [1] 93.0 | 93.1 | 93.5 | 93.6 | 93.5 | 93.6 | 93.6 | 93.4 | 93.5 | 93.5 | 93.8 | 93.5 |
| 74% Toluene+26% N-Heptane | 93.4 | 92.6 | 92.8 | 92.8 | 93.0 | 93.1 | 93.0 | 92.7 | 93.1 | 93.0 | 92.8 | 92.9 |
| RMFD-111-61 | 98.0 | 97.2 | 97.2 | 97.3 | 97.4 | 97.3 | 97.4 | 97.3 | 97.3 | 97.2 | 97.4 | 97.3 |

| Fuels Below 100 | Single Ignition and Modified Meter | | | | | | | | | | | |
|---|---|---|---|---|---|---|---|---|---|---|---|---|
| | Calib. Rating | Run Number | | | | | | | | | | Avg. Rating |
| | | 1 | 2 | 3 | 4 | 5 | 6 | 7 | 8 | 9 | 10 | |
| Standardization Fuel (74% Toluene+10% Isooctane+16% N-Heptane) | 99.6 | [2] 100.8 | [2] 100.7 | [2] 100.8 | [3] 100.5 | [2] 100.5 | [2] 100.6 | [2] 100.4 | [2] 100.3 | [2] 100.4 | [2] 100.4 | 100.5 |
| Light Alkylate | [1] 92.0 | 91.6 | 91.7 | 91.8 | 91.7 | 91.7 | 91.8 | 91.8 | 91.8 | 91.8 | 91.8 | 91.8 |
| 50% DIB+42.5% N-Hept.+7.5% Iso-Oct.+3.0 ml. TEL | [1] 93.0 | 93.5 | 93.9 | 94.0 | 93.9 | 93.9 | 93.9 | 93.8 | 93.7 | 93.8 | 94.0 | 93.8 |
| 74% Toluene+26% N-Heptane | 93.4 | 94.0 | 94.1 | 94.1 | 94.3 | 94.4 | 94.1 | 93.8 | 93.9 | 94.4 | 94.1 | 94.1 |
| RMFD-111-61 | 98.0 | 97.9 | 98.0 | 98.0 | 98.1 | 98.0 | 97.9 | 98.0 | 97.9 | 97.9 | 98.0 | 98.0 |

| Fuels Above 100 | Single Ignition and Standard Meter | | | | | | | | | |
|---|---|---|---|---|---|---|---|---|---|---|
| | Calib. Rating | Run Number | | | | | | | | Avg. Rating |
| | | 1 | 2 | 3 | 4 | 5 | 6 | 7 | 8 | |
| Standardization Fuel (74% Toluene + 20% Isooctane + 6% N-Heptane) | 108.0 | [4] 108.0 | [3] 108.4 | [3] 108.1 | [3] 108.1 | [5] 108.2 | [3] 107.9 | [3] 107.8 | [3] 107.7 | 108.0 |
| RMFD-112-61 | 104.6 | 105.3 | 104.7 | 105.3 | 105.1 | 105.6 | 104.9 | 105.1 | 105.0 | 105.1 |
| 50% DIB + 50% Isooctane | [1] 106.0 | 106.9 | 106.4 | 106.4 | 107.0 | 107.4 | 106.0 | 106.0 | 106.0 | 106.5 |
| 74% Toluene + 18% Isooctane + 8% N-Heptane | 106.1 | 106.3 | 105.9 | 105.4 | 105.8 | 106.2 | 105.8 | 105.9 | 105.5 | 105.8 |
| 115/145 Avgas | 106.2 | 106.3 | 106.2 | 106.4 | 106.3 | 106.0 | 106.3 | 106.4 | 106.0 | 106.2 |
| 74% Toluene + 20% Isooctane | 113.7 | 114.0 | 114.3 | 114.3 | 114.2 | 114.2 | 113.4 | 114.5 | 114.0 | 114.1 |

| Fuels Above 100 | Dual Ignition and Modified Meter | | | | | | | | | |
|---|---|---|---|---|---|---|---|---|---|---|
| | Calib. Rating | Run Number | | | | | | | | Avg. Rating |
| | | 1 | 2 | 3 | 4 | 5 | 6 | 7 | 8 | |
| Standardization Fuel (74% Toluene+20% Isooctane+6% N-Heptane) | 108.0 | [2] 107.2 | [2] 107.2 | [2] 107.3 | [2] 107.1 | [2] 107.3 | [2] 107.1 | [2] 107.2 | [2] 107.0 | 107.2 |
| RMFD-112-61 | 104.6 | 104.4 | 103.6 | 104.1 | 104.2 | 104.3 | 104.1 | 104.3 | 104.3 | 104.2 |
| 50% DIB+50% Isooctane | [1] 106.0 | 105.1 | 104.8 | 104.6 | 105.3 | 105.1 | 104.9 | 104.6 | 104.6 | 104.9 |
| 74% Toluene+18% Isooctane+8% N-Heptane | 106.1 | 105.4 | 105.6 | 105.0 | 105.1 | 105.3 | 105.4 | 105.1 | 105.2 | 105.3 |
| 115/145 Avgas | 106.2 | 105.7 | 105.5 | 105.5 | 105.7 | 105.7 | 105.8 | 105.6 | 105.3 | 105.6 |
| 74% Toluene+20% Isooctane | 113.7 | 112.7 | 112.8 | 112.9 | 112.8 | 113.3 | 112.5 | 113.2 | 113.0 | 112.9 |

See footnotes at end of table.

TABLE IV.—RESEARCH METHOD REPEATABILITY DATA OBTAINED IN EVALUATION OF DUAL IGNITION AND PHILLIPS MODIFIED METER—Continued

[Condition 3]

| Fuels Above 100 | Calib. Rating | Single Ignition and Modified Meter | | | | | | | | Avg. Rating |
| --- | --- | --- | --- | --- | --- | --- | --- | --- | --- | --- |
| | | Run Number | | | | | | | | |
| | | 1 | 2 | 3 | 4 | 5 | 6 | 7 | 8 | |
| Standardization Fuel (74% Toluene+20% Isooctane+6% N-Heptane) | 108.0 | [2] 109.0 | [2] 109.2 | [2] 109.6 | [2] 109.4 | [2] 109.5 | [2] 109.3 | [2] 108.9 | [2] 108.8 | 109.2 |
| RMFD-112-61 | 104.6 | 106.3 | 105.7 | 105.6 | 106.0 | 106.0 | 106.0 | 105.7 | 105.3 | 105.8 |
| 50% DIB +50% Isooctane | [1] 106.0 | 108.0 | 107.8 | 107.6 | 108.5 | 108.7 | 107.0 | 107.3 | 107.2 | 107.8 |
| 74% Toluene+18% Isooctane+8% N-Heptane | 106.1 | 107.3 | 107.2 | 106.5 | 106.9 | 107.3 | 106.9 | 106.6 | 106.6 | 106.9 |
| 115/145 Avgas | 106.2 | 106.2 | 106.5 | 106.3 | 106.4 | 106.4 | 106.5 | 106.2 | 106.3 | 106.4 |
| 74% Toluene+20% Isooctane | 113.7 | 116.0 | 115.9 | 116.0 | 115.6 | 115.8 | 115.2 | 115.5 | 115.6 | 115.7 |

[1] Phillips calibrated rating.
[2] Average of two ratings.
[3] Average of three ratings.
[4] Average of four ratings.
[5] Average of five ratings.

A comparison of the test data obtained under the three different test conditions was made on the basis of rating precision. Variance, the square of the standard deviation, was used as a measure of rating precision.

*Fuels below 100 octane number*

The non-homogeneity of the variances between the fuels did not allow the choice of a condition that minimizes variance except by the individual treatment of the test fuels. Table V gives the variances (ranked by magnitude) of the data for each condition on each fuel. The variance estimates are based on a minimum of ten observations per condition and fuel.

TABLE V.—TEST FUEL VARIANCES
[Condition Number-Variance]

| Light Alkylate | DIB Blend | 93.4 Toluene Blend | RMFD-111-61 |
| --- | --- | --- | --- |
| (#3) 0.00532 | (#1) 0.00684 | (#2) 0.03005 | (#3) 0.00477 |
| (#1) 0.00955 | (#3) 0.02289 | (#3) 0.03682 | (#2) 0.00705 |
| (#2) 0.01226 | (#2) 0.03222 | (#1) 0.05555 | (#1) 0.01356 |

The above data do not show any one condition to be outstanding among the fuels in the improvement of variance.

Table VI ranks the variances on the fuels within a test condition.

TABLE VI.—TEST FUEL VARIANCES
[Ranked Within Condition]

| Condition 1 | Condition 2 | Condition 3 |
| --- | --- | --- |
| (DIB) 0.00684 | (RMFD) 0.00705 | (RMFD) 0.00477 |
| (Alkylate) 0.00955 | (Alkylate) 0.01226 | (Alkylate) 0.00532 |
| (RMFD) 0.01356 | (Toluene) 0.03005 | (DIB) 0.02289 |
| (Toluene) 0.05555 | (DIB) 0.03222 | (Toluene) 0.03682 |

The brackets in the above data are used to show which variances are statisically different. Variances within a bracket are not considered significantly different. Any two variances not within the same bracket are statistically different. This table illustrates the non-homogeneity of the variance between the fuels within a condition.

*Fuels above 100 octane number*

The following tables show the variance data for the fuels above 100 as previously presented for the fuels below 100.

TABLE VII.—TEST FUEL VARIANCES
[Condition Number-Variance]

| RMFD-112-61 | DIB Blend | 106.1 Toluene | 115/145 Avgas | 113.7 Toluene |
| --- | --- | --- | --- | --- |
| (#2) 0.06292 | (#2) 0.07352 | (#2) 0.04004 | (#3) 0.01451 | (#2) 0.06864 |
| (#1) 0.07673 | (#1) 0.28432 | (#1) 0.09459 | (#1) 0.02553 | (#3) 0.07714 |
| (#3) 0.09654 | (#3) 0.3744 | (#3) 0.10728 | (#2) 0.02594 | (#1) 0.11007 |

The above tabulation shows Condition 2 gives the better rating precision for four of the five fuels, while Condition 3 can be ranked as giving the poorest.

The following tabulation again ranks the variances on the fuels within a test condition.

TABLE VIII.—TEST FUEL VARIANCES
[Ranked Within Condition]

| Condition 1 | Condition 2 | Condition 3 |
| --- | --- | --- |
| 115/145 Avgas 0.02553 | 115/145 Avgas 0.02594 | 115/145 Avgas 0.01451 |
| RMFD-112-61 0.07673 | 106.1 Toluene 0.04004 | 113.7 Toluene 0.07714 |
| 106.1 Toluene 0.09459 | RMFD-112-61 0.06292 | RMFD-112-61 0.09654 |
| 113.7 Toluene 0.11007 | 113.7 Toluene 0.06864 | 106.1 Toluene 0.10728 |
| DIB Blend 0.28432 | DIB Blend 0.07352 | DIB Blend 0.37444 |

In the above tabulation Condition 2 (dual ignition-modified meter combination) is the preferred condition. This selection is based on the fact that the fuel variances within Condition 2 are more homogeneous (within one bracket) and lower variances are obtained for all fuels except the 115/145 Avgas. Even though Condition 2 has the larger variance for the 115/145 Avgas, it is not considered statistically different than the variances for this fuel in Conditions 1 and 3.

The foregoing data indicates that the Research method octane rating for fuels having an octane number over 100 can be improved by the utilization of a detonation meter having a 500–2000 c.p.s. bandpass filter and duel ignition. The combination also maintains present accuracy for fuels having an octane number less than 100. It was observed that dual ignition in comparison with single ignition greatly increases the strength of the combustion pulse relative to the detonation pulse as recorded by the detonation pickup. The change is the strength relationship of the two pulses can cause difficulty in the operating performance of conventional meters but does not affect the operating performance of a detonation meter utilizing a filter to exclude frequencies in the 0-500 c.p.s. range.

The 500-2000 bandpass filter can be of any suitable design known in the art. For example, two filters can be utilized in series, one passing only frequencies below 2000 c.p.s. and the other passing only frequencies above 500 c.p.s. While the 500-2000 c.p.s. bandpass filter is presently preferred, it is within the contemplation of the invention to utilize a bandpass filter where the low frequency cutoff is in the range of 200-500 c.p.s. and the high frequency cutoff is in the range of 2000-4000 c.p.s. or higher.

Reasonable variation and modification are possible within the scope of the foregoing disclosure, the drawing and the appended claims to the invention.

I claim:

1. In a detonation measuring system comprising means for converting pressure variations in an engine cylinder into electrical current comprising voltage components representative of unwanted vibrations, voltage components representative of the main pressure variations in the cylinder, and voltage waves representative detonation, each voltage wave having an amplitude proportional to the peak intensity of a detonation in the cylinder, a filter, a threshold circuit for eliminating voltages of less than a predetermined amplitude whereby the output of said threshold circuit comprises a series of pulses, means for connecting the output of said means for converting through said filter to an input of said threshold circuit, and means responsive to said series of pulses for producing an output signal representative of the average peak detonation intensity; the improvement comprising means for producing dual ignition at two spaced points in said cylinder and wherein said filter is a bandpass filter which substantially blocks frequencies outside the range of 200-4000 c.p.s.

2. A detonation measuring system comprising an internal combustion engine having a cylinder therein, first and second means for substantially simultaneously igniting a combustible material at two spaced points in said cylinder, means for converting pressure variations in said cylinder into electrical current comprising voltage components representative of unwanted vibrations, voltage components representative of the main pressure variations in the cylinder, and voltage waves representative of detonation, each voltage wave having amplitude proportional to the peak intensity of a detonation in the cylinder, a 500-2000 c.p.s bandpass filter, a threshold circuit for eliminating voltages of less than a predetermined amplitude whereby the output of said threshold circuit comprises a series of pulses, means for connecting the output of said means for converting through said filter to an input of said threshold circuit, and means responsive to said series of pulses for producing an output signal representative of the average peak detonation intensity.

3. A detonation measuring system comprising an internal combustion engine having a cylinder therein, first and second means for substantially simultaneously igniting a combustible material at two spaced points in said cylinder, means for converting pressure variations in said cylinder into electrical current comprising voltage components representative of unwanted vibrations, voltage components representative of the main pressure variations in the cylinder, and voltage waves representative of detonation, each voltage wave having an amplitude proportional to the peak intensity of a detonation in the cylinder; a bandpass filter having a low frequency cutoff in the range of about 200 to about 500 c.p.s. and a high frequency cutoff in the range of about 2000 to about 4000 c.p.s.; means for connecting the output of said means for converting to an input of said filter; a threshold circuit connected to the output of said filter for eliminating voltages of less than a predetermined amplitude from the output signal of said filter whereby the output of said threshold circuit comprises a series of pulses; first pulsing circuit for producing spaced exponential pulses each having an amplitude proportional to a respective one of said series of pulses; a second pulsing circuit for producing overlapping pulses each having an amplitude proportional to a respective one of said spaced exponential pulses; means for integrating said overlaping pulses to produce an output signal representative of detonations occurring in the cylinder.

References Cited by the Examiner

UNITED STATES PATENTS

| | | | |
|---|---|---|---|
| 2,340,714 | 2/1944 | Traver et al. | 73—35 |
| 2,518,427 | 8/1950 | Lindberg et al. | 73—35 X |
| 2,622,441 | 12/1952 | Richardson et al. | 73—35 X |
| 2,789,269 | 4/1957 | De Boisblanc | 73—35 X |
| 2,867,766 | 1/1959 | Broder et al. | 73—35 X |

OTHER REFERENCES

An article from "Groupement Recherches Aeronautiques, Note Technique No. 27," by R. Vichniwsky, 94 pages, page 18.

RICHARD C. QUEISSER, *Primary Examiner.*

J. J. GILL, *Assistant Examiner.*